United States Patent [19]

König et al.

[11] Patent Number: 5,066,624
[45] Date of Patent: Nov. 19, 1991

[54] REFRACTORY THIXOTROPIC VIBRATION COMPOUND FOR THE VIBRATION LINING OF METALLURGICAL VESSELS

[75] Inventors: Gert König, Cologne; Jürgen Baumann, Neuss, both of Fed. Rep. of Germany

[73] Assignee: Martin & Pagenstecher GmbH, Cologne, Fed. Rep. of Germany

[21] Appl. No.: 41,032

[22] Filed: Apr. 23, 1987

[30] Foreign Application Priority Data

May 7, 1986 [DE] Fed. Rep. of Germany ....... 3615505

[51] Int. Cl.$^5$ ...................... C04B 35/16; C04B 35/48
[52] U.S. Cl. .................................. 501/107; 501/104; 501/105
[58] Field of Search ............... 501/104, 105, 107, 112, 501/119

[56] References Cited

U.S. PATENT DOCUMENTS

| | | | |
|---|---|---|---|
| 2,999,759 | 9/1961 | Heuer | 501/112 |
| 3,752,682 | 8/1973 | Nameischi et al. | 501/107 |
| 4,212,680 | 7/1980 | Schulz | 501/107 |
| 4,292,084 | 9/1981 | Thrower et al. | 501/107 |
| 4,400,474 | 8/1983 | Copperthwaite et al. | 501/119 |
| 4,508,835 | 4/1985 | Kaniuk et al. | 501/94 |
| 4,569,920 | 2/1986 | Smith-Johannsen | 501/1 |
| 4,623,131 | 11/1986 | Roberts | 501/107 |

OTHER PUBLICATIONS

Hawley, ed., *Condensed Chemical Dictionary*, 10th ed.; Van Nostrand Reinhold, NY, 1981 p. 32.

*Primary Examiner*—Theodore Murry
*Assistant Examiner*—David M. Brunsman
*Attorney, Agent, or Firm*—Sprung Horn Kramer & Woods

[57] ABSTRACT

The invention relates to a refractory thixotropic self-hardening vibration compound on the basis of zirconium silicate having the following chemical composition (in % by mass);

| | |
|---|---|
| 20 to 30% | $SiO_2$ |
| 20 to 45% | $Al_2O_3$ |
| 0.7 to 1.4% | $TiO_2$ |
| 0.2 to 0.8% | $P_2O_5$ |
| 0 to 1.5% | $K_2O + Na_2O + LiO_2$ |
| 0 to 1.0% | $Fe_2O_3$ |
| 0 to 0.05% | CaO |
| residue | $ZrO_2$ |

9 Claims, No Drawings

REFRACTORY THIXOTROPIC VIBRATION COMPOUND FOR THE VIBRATION LINING OF METALLURGICAL VESSELS

The invention relates to a refractory thixotropic self-curing vibration compound on the basis of zirconium silicate for the vibration lining of metallurgical vessels, more particularly steel plant ladles.

German Patent Application P 34 45 559.0, which is not a prior publication, relates to a thixotropic body having the following chemical composition (in % by mass):

| | |
|---|---|
| 24 to 29% | $SiO_2$ |
| 10 to 20% | $Al_2O_3$ |
| 0.2 to 0.8% | $P_2O_5$ |
| 0 to 1.5% | $K_2O + Na_2O + LiO_2$ |
| 0 to 0.5% | $Fe_2O_3$ |
| 0 to 0.05% | CaO |
| residue | $ZrO_2$ | and the following crystallographic analysis (in % by mass) to obtain a vibration density of at least 3.6 g/cm³:

| | |
|---|---|
| 20 to 30% | melt-zirconium silicate-corundum |
| 1 to 5% | alumina |
| 0.1 to 0.5% | amorphous silica |
| 0.3 to 1% | aluminium metaphosphate |
| 0.5 to 4% | alkali silicates with a molar ratio of 1:2 to 1:4 |
| residue | zirconium silicate | and the following grain fraction:

| | |
|---|---|
| 26 to 32% | up to 0.06 mm |
| 32 to 52% | 0.06 to 0.5 mm |
| 23 to 38% as residue | 0.5 to 5 mm |

The melt-zirconium silicate-corundum can have the following chemical composition (in % by mass):

| | |
|---|---|
| 13 to 18% | $SiO_2$ |
| 32 to 37% | $ZrO_2$ |
| residue | $Al_2O_3$ | and a raw grain density of at least 3.60 g/cm³ and a total porosity of 8% and less.

The melt-zirconium silicate-corundum is a melting product of zirconium silicate and corundum. Due to its method of manufacture it is a relatively expensive product which moreover is not available in just any quantities.

It is an object of the invention to provide a thixotropic composition which is just as good as the aforementioned one, but more inexpensive.

It has now been surprizingly found that this object is achieved if sintered bauxite is substituted for the melt-zirconium silicate-corundum.

The invention therefore provided a refractory thixotropic self-curing vibration composition on the basis of zirconium silicate, which is characterized by the following chemical composition (in % by mass):

| | |
|---|---|
| 20 to 30% | $SiO_2$ |
| 20 to 45% | $Al_2O_3$ |
| 0.2 to 0.8% | $P_2O_5$ |
| 0.7 to 1.4% | $TiO_2$ |
| 0 to 1.5% | $K_2O + Na_2O + LiO_2$ |
| 0 to 1.0% | $Fe_2O_3$ |
| 0 to 0.05% | CaO |
| residue | $ZrO_2$ |

To obtain a raw vibration density in the moist condition of at least 3.4 g/cm³, the composition comprises of the following refractory basic materials (in % by mass):

| | |
|---|---|
| 25 to 50% | sintered bauxite |
| 1 to 10% | alumina |
| 0.1 to 3.0% | amorphous silica |
| 0.3 to 1% | aluminium metaphosphate |
| 0.5 to 4% | alkali silicates with a molar ratio of 1:2 to 1:4 |
| residue | zirconium silicate. |

The following grain fraction:

| | |
|---|---|
| 20 to 35% | up to 0.06 mm |
| 25 to 60% | 0.06 to 0.5 mm |
| 5 to 55% | 0.5 to 5 mm |

The zirconium silicate has the following grain spectrum:

| | |
|---|---|
| 20 to 40 | up to 0.06 mm |
| 60 to 80 | 0.06 to 0.5 mm |

Advantageously the sintered bauxite has the following chemical composition (in % by mass):

| | |
|---|---|
| 5 to 13% | $SiO_2$ |
| 80 to 90% | $Al_2O_3$ |
| residue | impurities | and possesses a raw grain density of at least 3.0 g/cm³ and a total porosity of 20% and less.

The alumina used is reactive α-alumina having a mean primary grain size below 3.5 μm and a grain size of at least 45% below 2 μm, the silica used being colloidal silica with a grain size below 1 μm.

According to another feature of the invention, the quantity of water for mixing is 3.0 to 5.0 kg per 100 kg of dry substance.

According to another possible feature of the invention, it contains 0.05 to 0.2% by mass of a pulverulent wetting agent, preferably alkyl aryl polyoxy ethanol.

For the vibration lining of metallurgical vessels, more particularly steel plant ladles with the refractory thixotropic composition according to the invention, the components of the compound are intensively mixed in the dry condition; water for mixing is added before vibration starts; the moist compound is mixed and filled with constant vibration into the space between an introduced template and the ladle wall; and the lining is heated after the removal of the template.

Another feature of the invention is that water for mixing is added with a precision of at least 0.1% and the moist compound is mixed for at least 2 and at most 10 minutes. After the template has been removed, the lining is heated to 150° C. at a maximum speed of 8° C./hour.

German OS 2927993 discloses a refractory vibratable composition for the lining of metallurgical vessels which can be made of zirconium silicate, calcined bauxite, calcined kaolin and phosphoric acid.

This known vibration composition is not liable to suggest the use of sintered bauxite in the vibration composition according to the invention, since the former has bulk densities of only between 2.35 and 2.50 g/cm$^3$, obviously due to the porous calcined bauxite. Its slag resistance must therefore be regarded as inadequate. The high water content of between 6.4 and 7.1% involves the risk that the vibrated lining will collapse on itself when the template has been removed.

German OS 3027192 discloses a vibratable plastic mixture for use in refractory linings, which is based on a conventional refractory raw material, bauxite and zirconium silicate being mentioned amongst other possibilities. The mixture must contain 4 to 25 parts by weight of a thixotropizing agent in the form of a clay product, and also 0.1 to 0.5 parts by weight of an alkaline electrolyte having a pH of 10 to 11, and 4 to 8 parts by weight of water.

Neither is this prior art vibratable composition liable to suggest the composition according to the invention. According to German OS 3027192 it seems to be necessary to make zirconium silicate-bauxite vibratable with a thixotropizing agent in the form of clay. The clay leads to excessively high water contents, drying problems and also shrinkage cracks which cause premature wear. Moreover, due to predensification its transportability and storability are limited.

In contrast, the advantages of the vibration composition with sintered bauxite according to the invention are that the composition can be stored for a long time (>6 months), does not densify during transport, can be readily dried due to the low water contents and shows no shrinkage cracks when utilized.

The invention will now be explained on the basis of embodiments thereof.

EXAMPLE 1

A thixotropic self-curing vibration composition according to the invention for lining a steel plant ladle with a capacity of 85 tonnes had the following refractory components:

| | |
|---|---|
| 40% by mass | zirconium silicate with a grain size 0.05 to 0.5 mm |
| 22% by mass | zirconium silicate with a grain size 0 to 0.06 mm |
| 30% by mass | sintered bauxite with a grain size 1 to 3 mm |
| 4.5% by mass | α-alumina with an average primary grain size <3.5 μm |
| 2% by mass | amorphous silica with a grain size <1 μm. |

The sintered bauxite used had the following chemical composition (in % by mass):

| | |
|---|---|
| 6% | SiO$_2$ |
| 88% | Al$_2$O$_3$ |
| residue | impurities | the raw grain density being 3.15 g/cm$^3$ and the total porosity 18%.

The refractory components were intensively mixed in a mixer with the addition of

| | |
|---|---|
| 1.1% | aluminium metaphosphate powder |
| 1% | potassium silicate with a molar ratio of 1:2.5 | and packed air-tight.

Chemical analysis of the composition was as follows (in % by mass):

| | |
|---|---|
| 0.35% | Fe$_2$O$_3$ |
| 26% | SiO$_2$ |
| 29% | Al$_2$O$_3$ |
| 0.5% | P$_2$O$_5$ |
| 0.5% | K$_2$O |
| 1.0% | TiO$_2$ |
| residue | ZrO$_2$ |

The grain fractions were distributed as follows:

| | |
|---|---|
| 26% | up to 0.06 mm |
| 44% | 0.06 to 0.5 mm |
| 30% | 0.5 to 5 mm |

The composition was free from clay and hydraulic bonding agent and therefore had no water of crystallization. The free SiO$_2$ content was 2%. In a ladle lined with this composition it was possible to perform desulphurization treatments with lime-containing substances with better results and to cast steels with high manganese contents. At a steel works the dry composition was introduced into a compulsory mixer in charges of 2 tonnes each and intensively mixed with the addition of 3.4 kg of mixing water per 100 kg of dry composition.

The water was metered with a precision of 0.1% using an electrical impulse control system. The mixing time following the addition of the water was 4 minutes. Then the composition was removed from the mixer and transported to the steel plant ladle to be lined. The mixture was filled into the space between an introduced template and the ladle wall and vibration was performed within a period of 4 minutes.

After vibration the template was removed. The lining was then heated at a speed of 6° C./hour to 150° C. and then brought to operating temperature.

The finished lining had the following properties:

| | |
|---|---|
| Vibration density (raw density) moist | 3.55 g/cm$^3$ |
| Total porosity | 19% by volume |
| Gas permeability | 0.4 nPm |
| Thermal expansion up to 1000° C. | 0.5% |
| Cold compressive strength after prefiring 1000° C. | 67 N/mm$^2$ |

When special steel melts were treated in the lined ladle the lining withstood 119 charges; this was 1.4-times the resistance of a lining using blocks (about 80 charges).

EXAMPLE 2

Another thixotropic self-curing composition according to the invention had the following components (in % by mass) of the grain size stated:

| | |
|---|---|
| 30% by mass sintered bauxite | 1 to 3 mm |
| 7% by mass sintered bauxite | 0.06 to 0.5 mm |
| 3% by mass sintered bauxite | <0.06 |
| 32% by mass zirconium silicate | 0.05 to 0.5 mm |
| 20% by mass zirconium silicate | 0 to 0.06 mm |

-continued

| | |
|---|---|
| 4.5% by mass α-alumina | <3.5 μm |
| 2% by mass amorphous silica | |

The chemical properties raw grain density and total porosity of the sintered bauxite corresponded to Example 1.

The refractory components were intensively mixed in the dry condition in a mixer with the addition of

| | |
|---|---|
| 0.5% | aluminium metaphosphate powder |
| 1% | potassium silicate with a molar ratio of 1:2.5 |
| 0.9% | wetting agent (to 100%) | and treated as in Example 1, but with the addition of 3.9% water.

The chemical analysis of the composition was (in % by mass):

| | |
|---|---|
| 1.05% | $Fe_2O_3$ |
| 26.5% | $SiO_2$ |
| 36.8% | $Al_2O_3$ |
| 0.55% | $P_2O_5$ |
| 0.53% | $K_2O$ |
| 1.02% | $TiO_2$ |
| residue | $ZrO_2$ |

The grain fractions were distributed as follows:

| | |
|---|---|
| 28% | up to 0.06 mm |
| 42% | 0.06 to 0.5 mm |
| 30% | 0.5 to 5 mm |

As in Example 1, the composition was used for lining a steel plant ladle.

The finished lining had the following properties:

| | |
|---|---|
| Vibration density (raw density) moist | 3.41 g/cm$^3$ |
| Total porosity | 21% by volume |
| Thermal expansion up to 1000° C. | 0.52% |
| Cold compressive strength after prefiring 1000° C. | 49 N/mm$^2$ |

The lining withstood 109 charges.

We claim:

1. A refractory thixotropic self-curing zirconium silicate-based vibration compound for obtaining a vibration density of at least 3.5 g/cm$^3$ having the following chemical composition (in % by mass):

| | |
|---|---|
| 20 to 30% | $SiO_2$ |
| 20 to 45% | $Al_2O_3$ |
| 0.7 to 1.4% | $TiO_2$ |
| 0.2 to 0.8% | $P_2O_5$ |
| 0 to 1.5% | $K_2O + Na_2O + LiO_2$ |
| 0 to 1.0% | $Fe_2O_3$ |
| 0 to 0.05% | CaO |
| residue | $ZrO_2$, | and consisting essentially of the following refractory basic material composition (in % by mass):

| | |
|---|---|
| 25 to 50% | sintered bauxite |
| 1 to 10% | alumina |
| 0.1 to 3.0% | amorphous silica |
| 0.3 to 1% | aluminium metaphosphate |
| 0.5 to 4% | alkali silicates with a molar ratio of 1:2 to 1:4 |
| residue | zirconium silicate, | and the following grain fraction:

| | |
|---|---|
| 20 to 35% | up to 0.06 mm |
| 25 to 60% | 0.06 to 0.5 mm |
| 5 to 55% | 0.5 to 5 mm. |

2. A compound according to claim 1, characterized in that the zirconium silicate has the following grain spectrum:

| | |
|---|---|
| 20 to 40 | up to 0.06 mm |
| 60 to 80 | 0.06 to 0.5 mm. |

3. A compound according to claim 2, characterized in that the sintered bauxite has the following chemical composition (in % by mass):

| | |
|---|---|
| 5 to 13% | $SiO_2$ |
| 80 to 90% | $Al_2O_3$ |
| residue | impurity | and possesses a grain raw density of at least 3.0 g/cm$^3$ and a total porosity of 20% and less.

4. A compound according to claim 2, characterized in that the alumina used is reactive α-alumina having a mean primary grain size below 3.5 μm and a grain size of at least 45% below 2 μm, the silica used being colloidal silica with a grain size below 1 μm.

5. A compound according to claim 4, containing 3.0 to 5.0 kg of water per 100 kg of dry substance.

6. A compound according to claim 1, characterized in that it contains 0.05 to 0.2% by mass of a pulverulent alkyl aryl polyoxy ethanol as wetting agent.

7. A process for the vibration lining of a steel plant ladle with a refractory thixotropic mass having a density of at least 3.5 g/m$^3$ comprising intensively mixing in dry condition a mixture having the following chemical composition:

| | |
|---|---|
| 20 to 30% | $SiO_2$ |
| 20 to 45% | $Al_2O_3$ |
| 0.7 to 1.4% | $TiO_2$ |
| 0.2 to 0.8% | $P_2O_5$ |
| 0 to 1.5% | $K_2O + Na_2O + LiO_2$ |
| 0 to 1.0% | $Fe_2O_3$ |
| 0 to 0.5% | CaO |
| residue | $ZrO_2$, | and consisting essentially of the following refractory basic material composition (in % by mass):

| | |
|---|---|
| 25 to 50% | sintered bauxite |
| 1 to 10% | alumina |
| 0.1 to 3.0% | amorphous silica |
| 0.3 to 1% | aluminium metaphosphate |
| 0.5 to 4% | alkali silicates with a molar ratio of 1:2 to 1:4 |
| residue | zirconium silicate, | and the following grain fraction:

| | |
|---|---|
| 20 to 35% | up to 0.06 mm |
| 25 to 60% | 0.06 to 0.5 mm |
| 5 to 55% | 0.5 to 5 mm, | adding about 3 to 5% of water, filling the water-containing mix into a space between the inside wall of the ladle and a template inside the ladle defining the space to be filled, vibrating the mix as it is being filled into the space, removing the template, and heating the remaining lining.

8. A process according to claim 7, characterized in that the water for mixing is added with a precision of at least 0.1% and the moist compound is mixed for at least 2 and at most 10 minutes.

9. A process according to claim 7, characterized in that after the template has been removed, the lining is heated to 150° C. at a maximum speed of 8° C./hour.

* * * * *